US012574066B2

(12) United States Patent
ud Din et al.

(10) Patent No.: US 12,574,066 B2
(45) Date of Patent: Mar. 10, 2026

(54) TRANSCEIVER SWITCH CIRCUITRY

(71) Applicant: Telefonaktiebolaget LM Ericsson (publ), Stockholm (SE)

(72) Inventors: Imad ud Din, Flyinge (SE); Christian Elgaard, Lund (SE); Stefan Andersson, Flyinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 307 days.

(21) Appl. No.: 18/245,964

(22) PCT Filed: Sep. 30, 2020

(86) PCT No.: PCT/EP2020/077431

§ 371 (c)(1),
(2) Date: Mar. 20, 2023

(87) PCT Pub. No.: WO2022/069037

PCT Pub. Date: Apr. 7, 2022

(65) Prior Publication Data

US 2023/0344462 A1    Oct. 26, 2023

(51) Int. Cl.
*H04B 1/44* (2006.01)

(52) U.S. Cl.
CPC ...................................... *H04B 1/44* (2013.01)

(58) Field of Classification Search
None
See application file for complete search history.

(56) References Cited

U.S. PATENT DOCUMENTS 6,421,546 B1 * 7/2002 Tsao .......................... H04B 1/44
                                                    455/343.1
6,472,934 B1 * 10/2002 Pehlke .................. H03F 1/0288
                                                    330/10
(Continued)

FOREIGN PATENT DOCUMENTS

CN        108566188 A      9/2018
EP        3609085 A1 *    2/2020     ............. H03F 1/565
(Continued)

OTHER PUBLICATIONS

International Search Report and Written Opinion dated Jun. 7, 2021 for International Application No. PCT/EP2020/077431 filed Sep. 30, 2020, consisting of 8 pages.
(Continued)

*Primary Examiner* — Gennadiy Tsvey
(74) *Attorney, Agent, or Firm* — Weisberg I.P. Law, P.A.

(57)    ABSTRACT

A transceiver switch circuitry having an antenna port, a receiver port, a first transmitter port and a second transmitter port. The transceiver switch circuitry is configured to be operable in a reception mode to allow reception signals at the antenna port to be forwarded to the receiver port, and in a transmission mode to allow transmission signals, having a center frequency with a wavelength $\lambda$, at the first transmitter port and the second transmitter port to be forwarded to the antenna port for transmission. The transceiver switch circuitry has a receive arrangement including a first $\lambda/4$ impedance transformer and a first switch circuitry configured to ground the first $\lambda/4$ impedance transformer at the receiver port in the transmission mode; and a transmit arrangement having a second $\lambda/4$ impedance transformer and a second switch circuitry configured to ground a second side of the second $\lambda/4$ impedance transformer in the reception mode.

19 Claims, 11 Drawing Sheets

(56) References Cited

U.S. PATENT DOCUMENTS

| | | | |
|---|---|---|---|
| 8,593,219 B1 * | 11/2013 | Root | H03F 1/0288 |
| | | | 330/124 R |
| 8,620,227 B2 * | 12/2013 | Cohen | H04B 1/48 |
| | | | 455/127.2 |
| 9,369,173 B1 | 6/2016 | Yoon | |
| 10,389,358 B1 | 8/2019 | Wang et al. | |
| 10,666,231 B2 | 5/2020 | Andersson | |
| 10,873,138 B2 | 12/2020 | Perumana et al. | |
| 11,539,333 B2 | 12/2022 | Yang et al. | |
| 2004/0119533 A1 * | 6/2004 | Kwon | H03F 3/24 |
| | | | 330/124 R |
| 2004/0185818 A1 | 9/2004 | Ha et al. | |
| 2005/0255810 A1 | 11/2005 | Monroe | |
| 2006/0073792 A1 * | 4/2006 | Schoning | H04B 1/525 |
| | | | 455/193.1 |
| 2006/0094357 A1 | 5/2006 | McCorkle | |
| 2007/0111686 A1 * | 5/2007 | Lee | H03F 1/0211 |
| | | | 455/127.3 |
| 2007/0232241 A1 | 10/2007 | Carley et al. | |
| 2007/0274238 A1 | 11/2007 | Kim | |
| 2007/0279099 A1 | 12/2007 | Goddard et al. | |
| 2008/0310382 A1 | 12/2008 | Nakagawa et al. | |
| 2009/0137218 A1 * | 5/2009 | Honda | H04B 1/04 |
| | | | 455/127.1 |
| 2011/0143690 A1 | 6/2011 | Jerng et al. | |
| 2013/0165057 A1 * | 6/2013 | Lee | H04B 1/0483 |
| | | | 455/101 |
| 2013/0329544 A1 * | 12/2013 | Griffioen | H04W 52/0206 |
| | | | 370/216 |
| 2013/0331043 A1 | 12/2013 | Perumana et al. | |
| 2014/0055195 A1 * | 2/2014 | Engala | H03F 1/3241 |
| | | | 330/124 R |
| 2014/0120968 A1 | 5/2014 | Mahmood | |
| 2014/0124908 A1 | 5/2014 | Sameshima et al. | |
| 2015/0054594 A1 * | 2/2015 | Apriyana | H01P 1/15 |
| | | | 333/103 |
| 2016/0028432 A1 | 1/2016 | Zhang et al. | |
| 2018/0279219 A1 * | 9/2018 | Tanaka | G01S 7/285 |
| 2019/0158047 A1 * | 5/2019 | Watkins | H03F 3/72 |
| 2019/0334572 A1 * | 10/2019 | Lin | H04B 1/18 |
| 2020/0083924 A1 | 3/2020 | Callendar et al. | |
| 2020/0274575 A1 | 8/2020 | Yang et al. | |

FOREIGN PATENT DOCUMENTS

| | | | | | |
|---|---|---|---|---|---|
| GB | 2437573 A | * | 10/2007 | | H04B 1/0483 |
| JP | H10284901 A | * | 10/1998 | | |
| JP | 2011010137 A | | 1/2011 | | |
| JP | 2011211589 A | | 10/2011 | | |
| WO | WO-9952172 A1 | * | 10/1999 | | H04B 1/48 |
| WO | 2018077409 A1 | | 5/2018 | | |
| WO | 2019057299 A1 | | 3/2019 | | |
| WO | 2021259495 A1 | | 12/2021 | | |

OTHER PUBLICATIONS

International Search Report and Written Opinion dated Jun. 18, 2021 for International Application No. PCT/EP2020/077432 filed Sep. 30, 2020, consisting of 8 pages.

International Search Report and Written Opinion dated Jul. 8, 2021 for International Application No. PCT/EP2020/083695 filed Nov. 27, 2020, consisting of 10 pages.

Notice of Allowance dated Jun. 18, 2025 for U.S. Appl. No. 18/252,617, filed May 11, 2023, consisting of 27 pages.

Notice of Allowance dated May 19, 2025 for U.S. Appl. No. 18/245,985, filed Mar. 20, 2023, consisting of 17 pages.

Indian Office Action dated Jan. 8, 2026 for Application No. 202317033410, consisting of 7 pages.

* cited by examiner

TRANSCEIVER SWITCH CIRCUITRY

CROSS-REFERENCE TO RELATED APPLICATION

This application is a Submission Under 35 U.S.C. § 371 for U.S. National Stage Patent Application of International Application Number: PCT/EP2020/077431, filed Sep. 30, 2020, entitled "A TRANSCEIVER SWITCH CIRCUITRY," the entirety of which is incorporated herein by reference.

TECHNICAL FIELD

The present disclosure relates to the field of transceiver switch circuitry, especially for transceivers for wireless communication and nodes using such transceivers.

BACKGROUND

Tx/Rx Isolators (or transceiver, TRX, Switches) are used in communications transceivers to protect the receiver circuitry from the power amplifier output signal. If the Tx signal reaches the Rx port without attenuation, the high amplitude may destroy the sensitive receiver inputs. The following describes the basic functions of a Tx/Rx isolator.

FIGS. 1a and 1b illustrate a transceiver switch 10, which includes a transmitter circuitry 12, a receiver circuitry 13, an antenna 11, a transmitter switch 5 and a receiver switch 6.

FIG. 1a shows a transceiver switch 10 in transmission, Tx, mode. The transmitter switch 5 is in an ON state or is closed so it presents a low impedance and the transmission signal generated in the transmitter circuitry 12 gets through to the antenna 11, as indicated by the dashed arrow 2. However, the receiver switch 6 is in an OFF state or is open and presents a large impedance compared to the receiver input impedance. As a result, most of the transmitter voltage swing drops across the open receiver switch 6 instead of the receiver input thus protecting the input of the receiver circuitry 13 from damage.

FIG. 1b shows the transceiver switch 10 in reception, Rx, mode. The transmitter switch 5 is in an OFF state in order to stop the received antenna signal from flowing to the transmitter output at the transmitter circuitry 12 (and increasing the Rx insertion loss). The receiver switch 6 is in ON state, presenting a low impedance to the signal from the antenna 11 as indicated by the dashed arrow 3 to the receiver circuitry 13.

Many radio systems, such as 4G and 5G, use modulated signals with high peak to average ratio, PAR, which is a cause of low overall efficiency at average (or back-off) output power. One of the main blocks responsible for this low efficiency at back-off is the power amplifier. One way of improving this, as exploited by the Doherty PA structure, is to use load modulation to achieve a higher power added efficiency, PAE, at average output power levels.

FIG. 2a shows one possible implementation of a Doherty amplifier 20. The Doherty amplifier 20 as seen in FIG. 2a comprises a main amplifier 21 and an auxillary, aux, amplifier 22. The main amplifier 21 drives a transmission line 23 with a phase of 0°. The aux amplifier 22 is OFF until the input signal strength reaches a certain threshold, so that the main amplifier 21 is solely responsible for driving the transmission line 23 with characteristic impedance $Z_1$.

As the input signal strength rises above the threshold, the aux amplifier 22 starts driving the node, marked with "a", between the transmission line 23 and the antenna 11 with a phase of 90° relative to the main amplifier 21. The output impedance of the main amplifier 21 is reduced due to load modulation as the signal amplitude increases, so the power amplifier can deliver high output power to the antenna 11.

Typically, the value of the transmission line impedance $Z_1$, as shown in FIG. 2a, is higher than 50Ω for the load modulation to work in node "a" while matching to the antenna impedance, which typically is 50Ω. High voltage levels exist both at node "a" and node "b".

Devices in modern Complementary Metal Oxide Semiconductor, CMOS, processes are unable to sustain large voltages. If high power levels are expected to be delivered by a power amplifier implemented in such a technology, it may become necessary to reduce the load impedance to limit the voltage levels at peak output power FIG. 2b shows an implementation of a Doherty amplifier 25. In the configuration of the Doherty amplifier 25 shown in FIG. 2b, a quarter wavelength transmission line 26 shown as $Z_2$ is added to the Doherty amplifier 20 of FIG. 2a in order to achieve a degree of freedom, which matches the impedance in node "a" to the antenna impedance.

This makes it possible to choose impedance value in node "a".

In radio frequency, RF, transceivers, both the transmission and reception circuits are connected to the antenna. In modern CMOS technologies, the thin oxide gates can typically tolerate only a limited voltage, meaning that high voltage levels at the RF input can damage the Low Noise Amplifier, LNA, of the receiver. In time division duplexing, TDD, systems, the PA and the LNA are typically connected to a transceiver (or TRX) switch that directs the signal either from the PA to antenna in Tx mode or from antenna to LNA in Rx mode, as illustrated in FIGS. 1a and 1b. Since high voltage levels exist at the antenna node, the switch must isolate the LNA from the antenna during TX mode, such that these high signal levels do not reach the LNA input.

In order to work properly as part of a 5G mm-wave transceiver, a transceiver must have low Tx insertion loss, low Rx insertion loss, high linearity and wide bandwidth.

Non-linearity of the TRX switch can result in poor Adjacent Channel Leakage Ratio, ACLR, at the antenna, compromising the error vector magnitude, EVM, and thus the performance of the transmitter. CMOS switches in current technologies are non-linear when operating with large voltage levels. The TRX switch should be much more linear than the PA in order not to be the dominant source of non-linearity in the Tx mode.

In distributed amplifiers, such as Doherty Amplifiers, typically, low output impedance (due to, for example, load modulation) is used to provide high power output while remaining within the safe voltage operating limits dictated by technology. A switch with integrated impedance matching of a low output impedance PA to a 50 Ohm antenna is desirable.

Traditionally, a switch is a separate block that causes some attenuation of the wanted signal due to its insertion loss. This loss typically comes from the internal components in the switch structure, for example, lossy transmission line segments or the CMOS devices used a switch. During Tx operation, any loss in the Tx to antenna path will affect the efficiency of the transmitter.

External components have traditionally been used for implementing the TRX functionality. However, this may not be feasible for mm-wave solutions due to package losses and high restrictions on board area when the solution should be used in an antenna array.

Solutions with integrated transceiver switch circuitry rely on CMOS switches to provide the isolation and handle the high Tx swing. Due to high voltage swing at the Tx output, multiple switches usually must be stacked in order to avoid breakdown. However, many stacked switches may result in high insertion loss during the Rx operation. A small number of switches, on the other hand, may result in a solution that is quite non-linear in the Tx mode. Normally integrated switches are narrow-band and have limited filtering of the spurious emissions from the PA.

SUMMARY

An object of the present disclosure is to provide a transceiver switch circuitry which seeks to mitigate, alleviate, or eliminate one or more of the above-identified deficiencies in the art and disadvantages singly or in any combination and to provide an improved transceiver switch with low insertion loss for distributed power amplifiers.

This object is obtained by a transceiver switch circuitry based on $\lambda/4$ transmission lines implemented with traditional Power Amplifiers, PA, (e.g. Doherty Amplifiers as shown in FIG. 2$b$) along with other components. The transceiver switch circuitry allows the transmission of signals to antenna path and reception of signals from antenna of the transceiver switch ensuring low or almost zero transmission insertion loss and reception insertion loss, high transmission to reception isolation and high linearity.

According to an aspect, a transceiver switch circuitry is provided. The transceiver switch circuitry comprises an antenna port connectable to an antenna circuitry, a receiver port connectable to a receiver circuitry, a first transmitter port connectable to a first transmitter circuitry and at least one second transmitter port connectable to at least one second transmitter circuitry. The transceiver switch circuitry is configured to be operable in a reception mode to allow reception signals at the antenna port to be forwarded to the receiver port, and configured to be operable in a transmission mode to allow transmission signals at the first transmitter port and the at least one second transmitter port to be forwarded to the antenna port for transmission. The transmission signals having a transmission center frequency with a wavelength, $\lambda$, and the reception signals having a reception center frequency within ten percent of the transmission center frequency. The transceiver switch circuitry further comprises a receive arrangement connected between the antenna port and the receiver port. The receive arrangement comprises a first quarter wavelength, $\lambda/4$, impedance transformer and a first switch circuitry configured to ground the first quarter wavelength, $\lambda/4$, impedance transformer at the receiver port in the transmission mode. The transceiver switch circuitry further comprises a transmit arrangement connected between the antenna port, the first transmitter port and the at least one second transmitter port. The transmit arrangement comprises a second quarter wavelength, $\lambda/4$, impedance transformer, having a first side connected to the antenna port and a second switch circuitry configured to ground a second side of the second quarter wavelength, $\lambda/4$, impedance transformer in the reception mode for at least the center frequency of the transmission signals.

According to another aspect, a transceiver for wireless communication is provided. The transceiver for wireless communication comprises a transceiver switch circuitry being connectable to an antenna via an antenna port for transmitting transmission signals during transmission mode, and receiving reception signals during reception mode. The transceiver comprises a first transmitter connected to a first transmitter port of the transceiver switch circuitry and at least one second transmitter connected to at least one second transmitter port of the transceiver switch circuitry. The first transmitter and the at least one second transmitter are configured to generate transmission signals. The transceiver further comprises a receiver connected to a receiver port of the transceiver switch circuitry and being configured to receive reception signals.

Advantageously, the transceiver switch reduces the insertion loss of the transmitter and improves transmission to reception isolation compared to traditional transceiver switch structures. Advantageously, the transceiver switch reduces the need for implementation of stacked MOS devices in the circuits by allowing placement of such devices in nodes that see smaller voltage swings than those present at the antenna. Lesser (or no) requirement to stack devices, improves transmitter insertion loss and results in a higher transformed impedance over a $\lambda/4$ line, thereby also improving receiver insertion loss.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
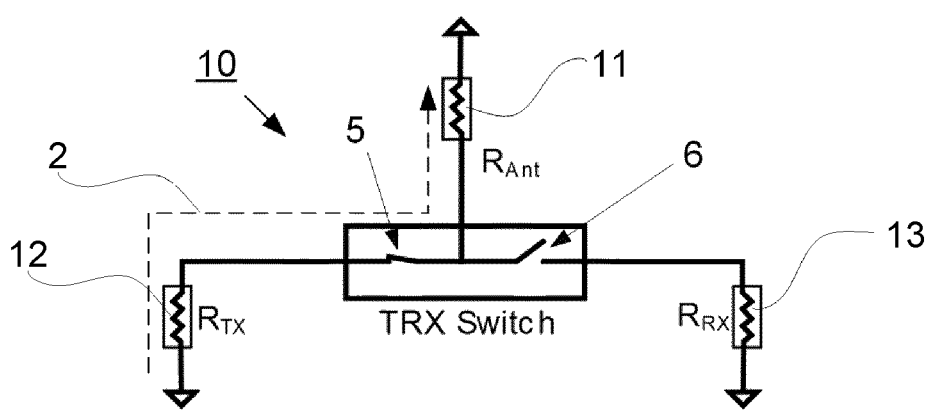
FIGS. 1$a$ and 1$b$ illustrate the functionality in a prior art transceiver switch.

Aspects of the present disclosure will be described more fully hereinafter with reference to the accompanying drawings. The apparatus disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a transceiver switch. As part of the development of the example embodiments presented herein, a problem will first be identified and discussed.

Figure 1B:
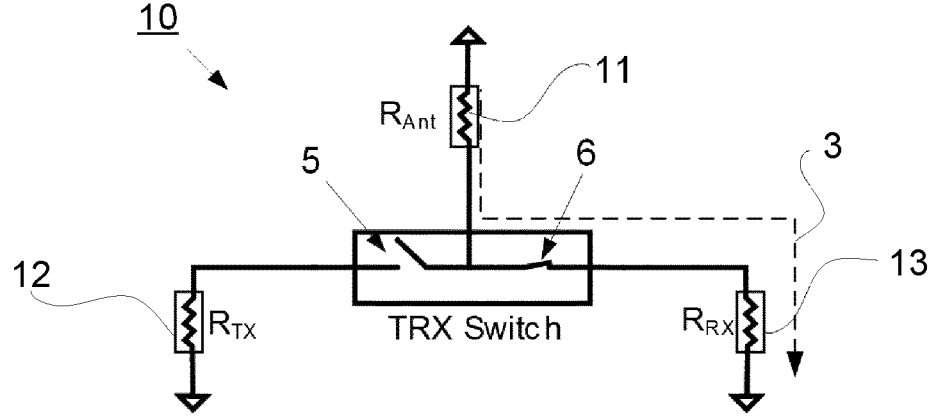

As mentioned above, FIGS. 1a and 1b describe the functionality of a prior art transceiver switch circuitry 10. Certain drawbacks have been identified for a transceiver to be suitable for use in 5G mm-wave transceivers, such as high insertion loss, low linearity or low bandwidth.

A high transmitter insertion loss results in low efficiency of the transmitter while a high receiver insertion loss results in loss of sensitivity for the receiver.

Low linearity of the transceiver may result in poor adjacent channel leakage power ratio, ACLR, at the antenna, compromising the error vector magnitude, EVM, and thus the performance of the transceiver. Complementary metal oxide semiconductor, CMOS, switches in current technology are quite non-linear when operating with large voltage swings. The TRX switch should be much more linear than the power amplifier, PA, in order not to be the dominant source of out-of-band spurious emissions in the Tx mode.

A wide bandwidth is highly desirable in mm-wave systems. If a switch has wideband enough that it covers a complete band, it is possible to reduce the cost and complexity of developing different variants of a product that operate in different sub-bands of the 3GPP frequency band.

In addition, it is highly desirable that the switch should have integrated filtering functionality to reduce or eliminate dependence on external filtering to meet 3GPP out-of-band spurious requirements.

In order to provide a high-power output with good back-off efficiency at mm-wave frequencies, many circuits use distributed amplifiers such as Doherty Amplifier. In such amplifiers, low output impedance is typically used to provide high power output while remaining within the safe voltage operating limits dictated by technology. A switch with integrated impedance matching of a low output impedance PA to a 50Ω antenna is desirable.

Figure 2A:
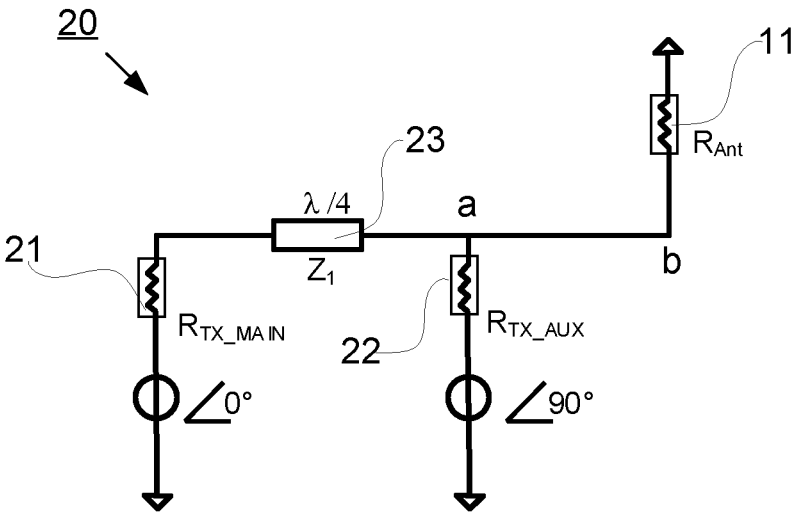
FIGS. 2$a$ and 2$b$ illustrate different implementations of Distributed Power Amplifiers, DPA.
Figure 2B:
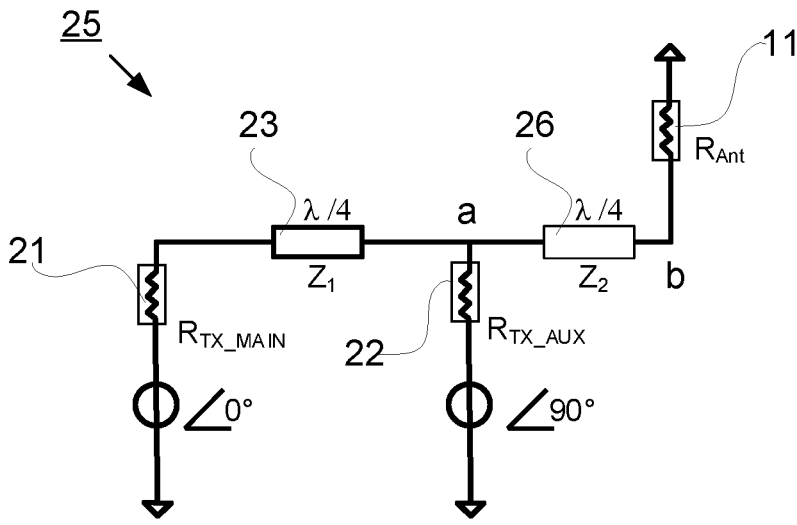
Figure 3A:
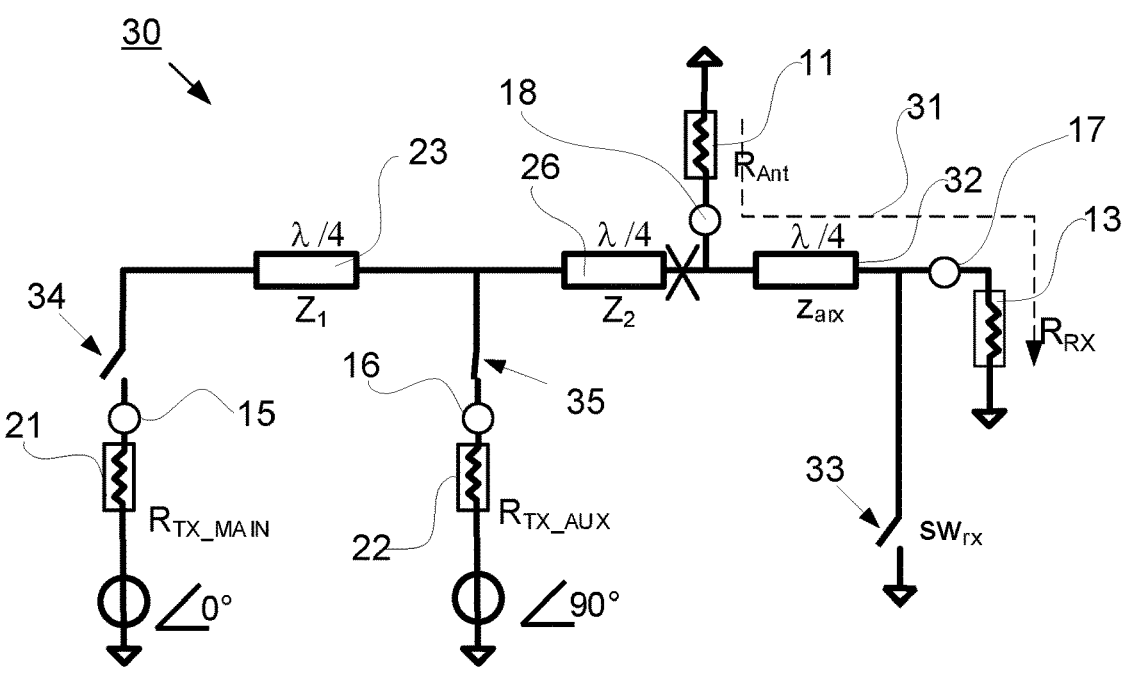
FIGS. 3$a$ and 3$b$ illustrate the functionality of an example transceiver switch circuitry.
Figure 3B:
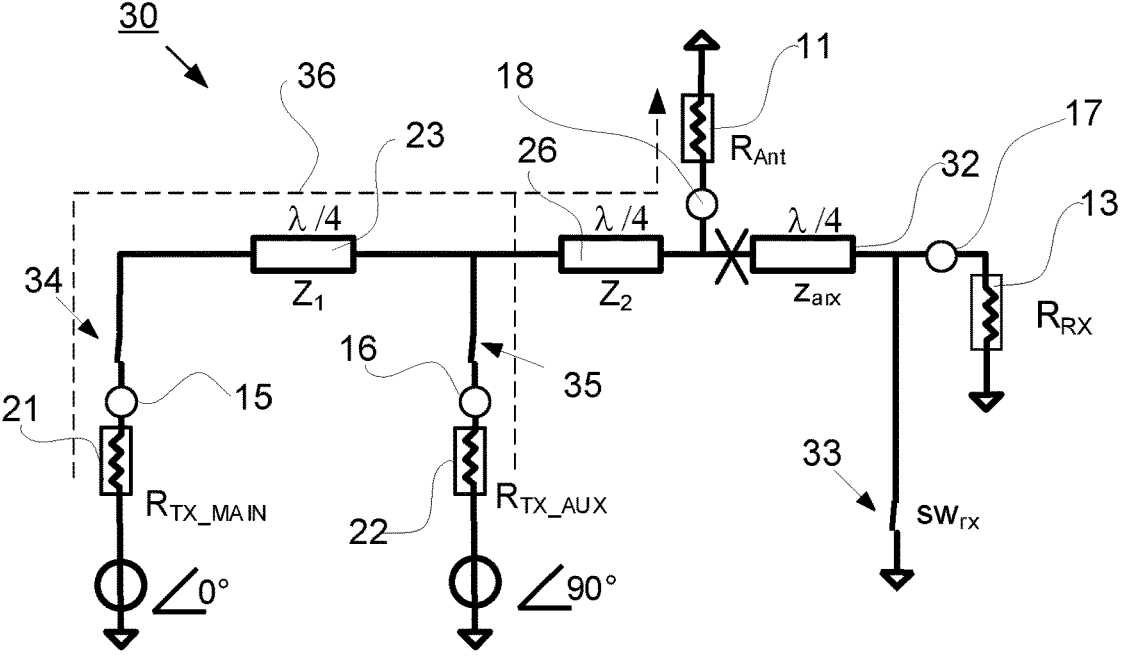

FIGS. 3a and 3b illustrate the functionality of an example transceiver switch circuitry 30. The transceiver switch circuitry 30 is based on λ/4 transmission lines implemented with a traditional Doherty amplifier along with other components. The transceiver switch circuitry 30 allows the transmission of signals to antenna path and reception of signals from antenna path of the transceiver switch circuitry 30 ensuring low or almost zero transmission insertion loss and reception insertion loss, high transmission to reception isolation and high linearity. The low or almost zero transmission insertion loss and reception insertion loss, high transmission to reception isolation and high linearity is achieved by implementing, on the transmitter side of the transceiver switch circuitry 30, a Doherty amplifier such as the Doherty amplifier 25 shown in FIG. 2b. As described earlier, in the configuration of FIG. 2b, a quarter wavelength transmission line 26 is added to the traditional Doherty amplifier 20 of FIG. 2a in order to match the impedance at node "a" to the antenna impedance. The transceiver switch circuitry 30 may be implemented in a transceiver for wireless communication, as an example.

The terms transceiver switch and transceiver switch circuitry are interchangeably used throughout the description.

The transceiver switch circuitry 30 comprises an antenna port 18, a receiver port 17, a first transmitter port 15 and at least one second transmitter port 16. The antenna port 18 is connectable to an antenna circuitry 11, the receiver port 17 is connectable to a receiver circuitry 13, the first transmitter port 15 is connectable to a first transmitter circuitry 21 and the at least one second transmitter port 16 is connectable to at least one second transmitter circuitry 22.

The transceiver switch circuitry 30 further comprises a receive arrangement connected between the antenna port 18 and the receiver port 17. The receive arrangement comprises a first quarter wavelength, λ/4, impedance transformer 32 and a first switch circuitry 33 configured to ground the first quarter wavelength, λ/4, impedance transformer 32 at the receiver port 17 in the transmission mode.

The receive arrangement can be defined as forming a signal receiving path from the antenna 11 during operation of the transceiver switch 30 in the reception mode.

The transceiver switch circuitry 30 further comprises a transmit arrangement connected between the antenna port 18, the first transmitter port 15 and the at least one second transmitter port 16. The transmit arrangement connected between the antenna port 18, the first transmitter port 15 and the at least one second transmitter port 16 is an arrangement of a Doherty amplifier such as the Doherty amplifier 25 of FIG. 2b described earlier. The transmit arrangement comprises a second quarter wavelength, λ/4, impedance transformer 26, having a first side connected to the antenna port 18, and a second switch circuitry 35 configured to ground a second side of the second quarter wavelength, λ/4, impedance transformer 26 in the reception mode for at least the center frequency of the transmission signals 36.

The transmit arrangement can be defined as forming a signal transmitting path to the antenna 11 during operation of the transceiver switch 30 in the transmission mode.

The transceiver switch circuitry 30 is configured to be operable in a reception mode to allow reception signals 31 at the antenna port 18 to be forwarded to the receiver port 17. The transceiver switch circuitry 30 is also configured to be operable in a transmission mode to allow transmission signals 36 at the first transmitter port 15 and the at least one second transmitter port 16 to be forwarded to the antenna port 18 for transmission. The transmission signals 36 have a transmission center frequency with a wavelength, λ, and the reception signals 31 have a reception center frequency within ten percent of the transmission center frequency.

In a TDD system, the reception signals have the same center frequency as the transmission signals or the reception center frequency is equal to the transmission center frequency. However, the transceiver switch circuitry could also be used for a half-duplex system like GSM if transmission and reception frequencies are close enough (say within 10% of the carrier frequency) so that the wavelength, λ, is a good approximation for both transmit and receive frequencies. During transmission, the transmission signals are prevented from entering the receiver due to the fact that the electrical length of the first transmission line is adapted to the center frequency of the transmission signals. During reception, the electrical length of the second transmission line should be adapted to the center frequency of the reception signals.

Insertion loss will be high if the difference in center frequency between the transmission signals and the reception signals is too high, i.e. >10%.

According to some embodiments, the receive arrangement is further configured to phase shift reception signals 31 in the reception mode, and the transmit arrangement is further configured to phase shift transmission signals 36 in the transmission mode.

According to some embodiments, the transmit arrangement further comprises a third quarter wavelength, λ/4, impedance transformer 23 and a third switch circuitry 34. The third quarter wavelength, λ/4, impedance transformer 23 has a first side connected to the second side of the second quarter wavelength, λ/4, impedance transformer 26. The third switch circuitry 34 is configured to connect the first transmitter port 15 with a second side of the third quarter wavelength, λ/4, impedance transformer 23 in the transmission mode. The third switch circuitry 34 also comprises a first port switch configured to connect the first transmitter circuitry 21 (main amplifier 21) to the first transmitter port 15 in transmission mode.

In this description, the first transmitter circuitry 21 corresponds to the main amplifier 21 and the least one second transmitter circuitry 22 corresponds to the aux amplifier 22 of FIGS. 2a and 2b. The receiver circuitry 13 refers to the receiver circuitry 13 of FIGS. 1a and 1b and the antenna 11 refers to the antenna 11 of FIGS. 1a and 1b.

In FIG. 3a, the functionality of the transceiver switch circuitry 30 in Rx mode is shown The second switch circuitry 35 is in an ON state and the third switch circuitry 34 is in an OFF state in the Rx mode. A low impedance is achieved at the second side of the second quarter wavelength, λ/4, impedance transformer 26, which results in a high impedance at the first side of the second quarter wavelength, λ/4, impedance transformer 26. Hence, a high impedance is presented/observed towards the second quarter wavelength, λ/4, impedance transformer 26 or the second transmitter port 16 from the antenna port 18. during Rx mode. As a result, flow of reception signals 31 towards the second transmitter port 16 is prevented, which thereby improves the receiver insertion loss and the reception signals 31 only passes via the first quarter wavelength, λ/4, impedance transformer 32 in the Rx mode.

Further, In Rx mode, first switch circuitry 33 is open or in an OFF stage preventing it from shorting the receive signal to ground.

In FIG. 3b, the functionality of the transceiver switch circuitry 30 in a Tx mode is shown. The first transmitter circuitry 21 and the at least one second transmitter circuitry 22 of the transceiver switch circuitry 30 functions like the main and aux amplifiers of a normal Doherty amplifier (such as the Doherty amplifier 25). In the transmission mode, as shown in FIG. 3b, the second switch circuitry 35 and the third switch circuitry 34 are closed or are in an ON state.

Further, the first switch circuitry 33 is closed or is in an ON state in the transmission mode causing a low impedance at the first side of the first quarter wavelength, λ/4, impedance transformer 32 connected to the receiver port 17, which results in a high impedance being presented at the second side of the first quarter wavelength, λ/4, impedance transformer 32 or the receiver port 17 as observed from the antenna port 18.

As a result, no transmission signals 36 reaches the receiver port 17, ideally, because of the large impedance presented towards the first quarter wavelength, λ/4, impedance transformer 32 or the receiver port 17 from the antenna port 18, thereby reducing the transmission insertion loss. Further, no additional transmission line segment is needed in Tx mode, which helps achieve a very low transmission insertion loss. The transmission insertion loss will be limited to the amount of signal that goes into the first quarter wavelength, λ/4, impedance transformer 32.

According to some embodiments, the first quarter wavelength, λ/4, impedance transformer 32 has an impedance that matches an impedance of the receiver circuitry 13 to the antenna impedance. According to some embodiments. the second quarter wavelength, λ/4, impedance transformer 26 has an impedance that matches an impedance of the antenna 11 to the desired impedance of the transmitter.

Each of the quarter wavelength, λ/4, impedance transformer 23, 26, 32 is a transmission line having an electrical length of λ/4 of the center frequency.

Figure 4:
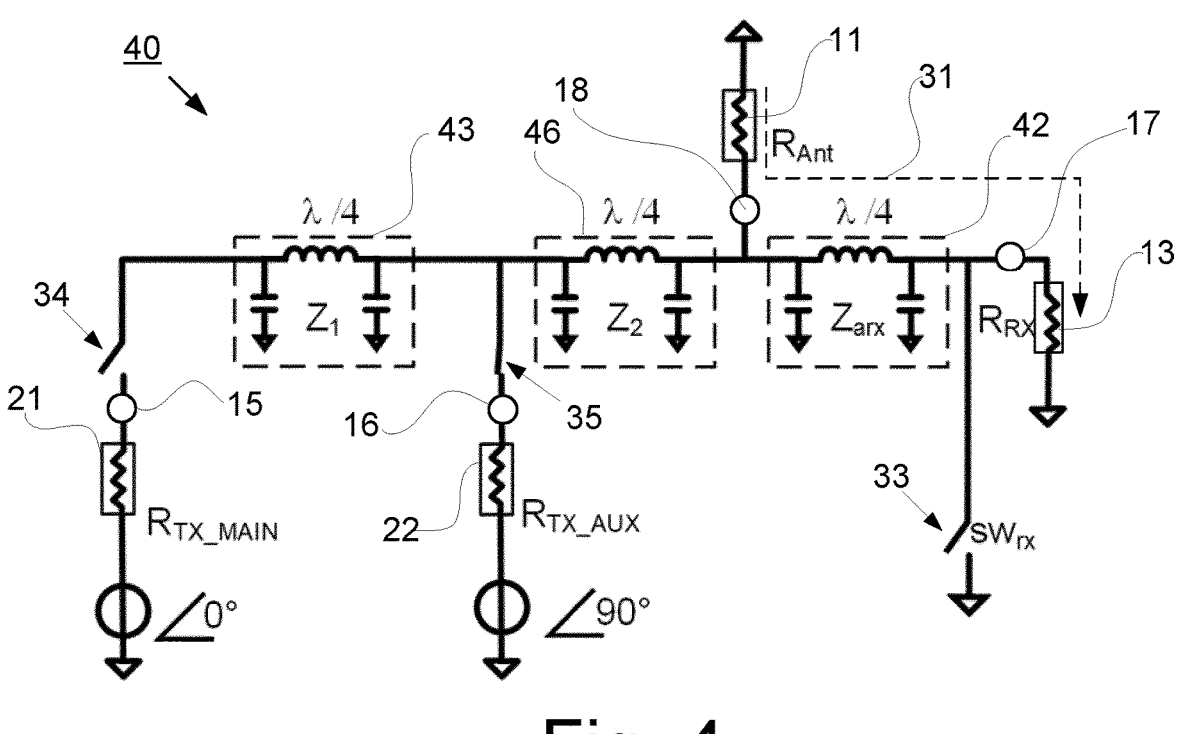
FIG. 4 illustrates a lumped component implementation of a quarter wavelength, $\lambda/4$, impedance transformer in the transceiver switch circuitry of FIG. 3$a$.
Figure 5:
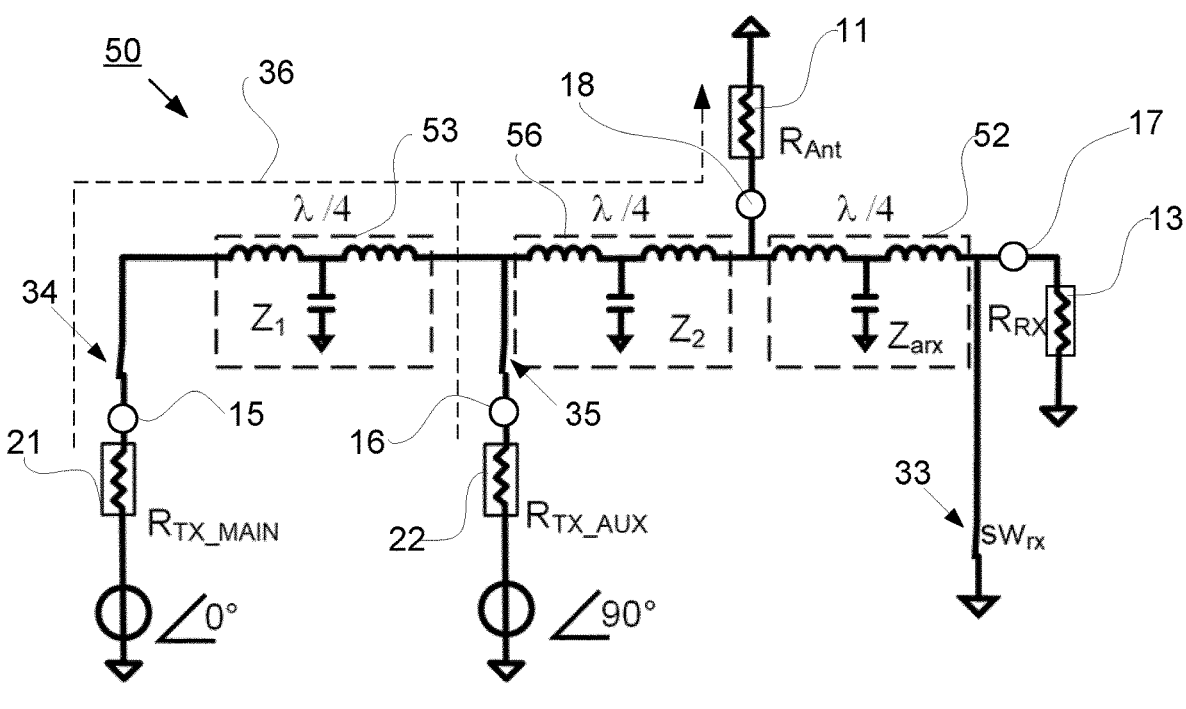
FIG. 5 illustrates a lumped component implementation of a quarter wavelength, $\lambda/4$, impedance transformer in the transceiver switch circuitry of FIG. 3$b$.

According to some embodiments, each of the quarter wavelength, λ/4, impedance transformer 23, 26, 32 comprises passive lumped components. FIGS. 4 and 5 below illustrate examples of transceiver switch 30 comprising passive lumped components. With the metal stacks available in current CMOS processes, it is typically not feasible to make good transmission lines with low losses. In addition, even at mm-wave frequencies, the physical length of λ/4 lines is too long to be integrated on-chip. Therefore, integrated transmission line segments in CMOS circuits are typically implemented using passive lumped components, as will be illustrated in FIGS. 4 and 5. These integrated transmission line segments have a limited bandwidth, and the bandwidth of a transmission line may be increased by adding additional transmission line segments, pi and/or T sections, used to implement the required electrical length of the transmission line.

FIG. 4 illustrates an example transceiver switch circuitry 40, which is an implementation of a quarter wavelength, λ/4, impedance transformer in the transceiver switch circuitry 30 of FIG. 3a. The transceiver switch circuitry 40 is shown implementing the quarter wavelength, λ/4, impedance transformers with lumped components arranged in a single pi section, indicated by 42, 43 and 46, replacing each transmission lines 32, 23 and 26 as seen in FIGS. 3a and 3b. FIG. 4 shows the transceiver switch 40 in the reception mode similar to FIG. 3a.

The transceiver switch circuitry 40 comprises a first quarter wavelength, λ/4, impedance transformer implemented as a first pi section 42, a second quarter wavelength, λ/4, impedance transformer implemented as a second pi section 46 and a third quarter wavelength, λ/4, impedance transformer implemented as a third pi section 43. The first pi section 42, the second pi section 46 and the third pi section 43 are similar lumped component versions of the first transmission line 32, the second transmission line 26 and the third transmission line 23 respectively of FIG. 3a.

The first pi section 42, in the receive arrangement, is arranged between the antenna port 18 and the receiver port 17. In the transmit arrangement, the second pi section 46 is connected to the antenna port 18 on a first side of the second pi section 46 and to the second switch circuitry 35 on the second side of the second pi section 46. The third pi section 43 has a first side connected to the second side of the second pi section 46 and a second side connected to the first transmitter port 15.

The lumped components comprise at least one inductor, L, and at least one capacitor, C, arranged in at least one pi section (or T-section as described in connection with FIG.

5). According to some embodiments, a first side of each capacitor C is connected to ground and a first and second side of the at least one inductor L is connected between a second side of each capacitor C. The first and second side of the inductor L constitutes connection points of each pi section. This is illustrated in FIG. 4, where the lumped components implemented in the transceiver switch circuitry 40 comprise one inductor and two capacitors arranged in a single pi section. The bandwidth of the line increases along with the number of passive sections (in this embodiment pi sections) used to implement a transmission line with the required electrical length.

FIG. 5 illustrates an example transceiver switch circuitry 50, which is an implementation of a quarter wavelength, λ/4, impedance transformer in the transceiver switch circuitry 30 of FIG. 3b. The transceiver switch circuitry 50 is shown implementing the quarter wavelength, λ/4, impedance transformers with lumped components arranged in a single T section, indicated by 52, 53 and 56, replacing each ideal transmission lines 32, 23 and 26 as seen in FIGS. 3a and 3b. FIG. 5 shows the transceiver switch 50 in the transmission mode.

The transceiver switch circuitry 50 comprises a first quarter wavelength, λ/4, impedance transformer implemented as a first T section 52, a second quarter wavelength, λ/4, impedance transformer implemented as a second T section 56 and a third quarter wavelength, λ/4, impedance transformer implemented as a third T section 53. The first T section 52, the second T section 56 and the third T section 53 are similar lumped component versions of the first transmission line 32, the second transmission line 26 and the third transmission line 23 respectively of FIG. 3b.

The first T section 52, in the receive arrangement, is arranged between the antenna port 18 and the receiver port 17. In the transmit arrangement, the second T section 56 is connected to the antenna port 18 on a first side of the second T section 56 and to the second switch circuitry 35 on the second side of the second T section 56. The third T section 53 has a first side connected to the second side of the second T section 56 and a second side connected to the first transmitter port 15.

The lumped components comprise at least one inductor, L, and at least one capacitor, C, arranged in at least one T section. According to some embodiments, a first side of a capacitor C is connected to ground and a second side of the capacitor C is connected to a second side of one inductor and a first side of another inductor. The second side of one inductor and the first side of the another inductor constitute connection points of each T section. This is illustrated in FIG. 5, where the lumped components implemented in the transceiver switch circuitry 50 comprise two inductors and one capacitor arranged in a single T section. The bandwidth of the line increases along with the number of passive sections (in this embodiment T sections) used to implement a transmission line with the required electrical length.

The transceiver switch 40 illustrated in FIG. 4 operates in the reception mode similar to the transceiver switch 30 as illustrated in FIG. 3a. The transceiver switch 50 illustrated in FIG. 5 operates in the transmission mode similar to the transceiver switch 30 as illustrated in FIG. 3b. The reception signals 31 during the reception mode only passes via the first pi section 42 (or the first T section 52). The transmission signals 36 during transmission mode passes via the third pi section 43 and/or the second pi section 46 (or the third T section 53 and/or the second T section 56).

According to some embodiments, the first pi section 42 (or the first T section 52) has an impedance that matches the impedance of the receiver circuitry 13, and the second pi section 46 (or the second T section 56) has an impedance that matches the impedance of the antenna 11.

Figure 6:
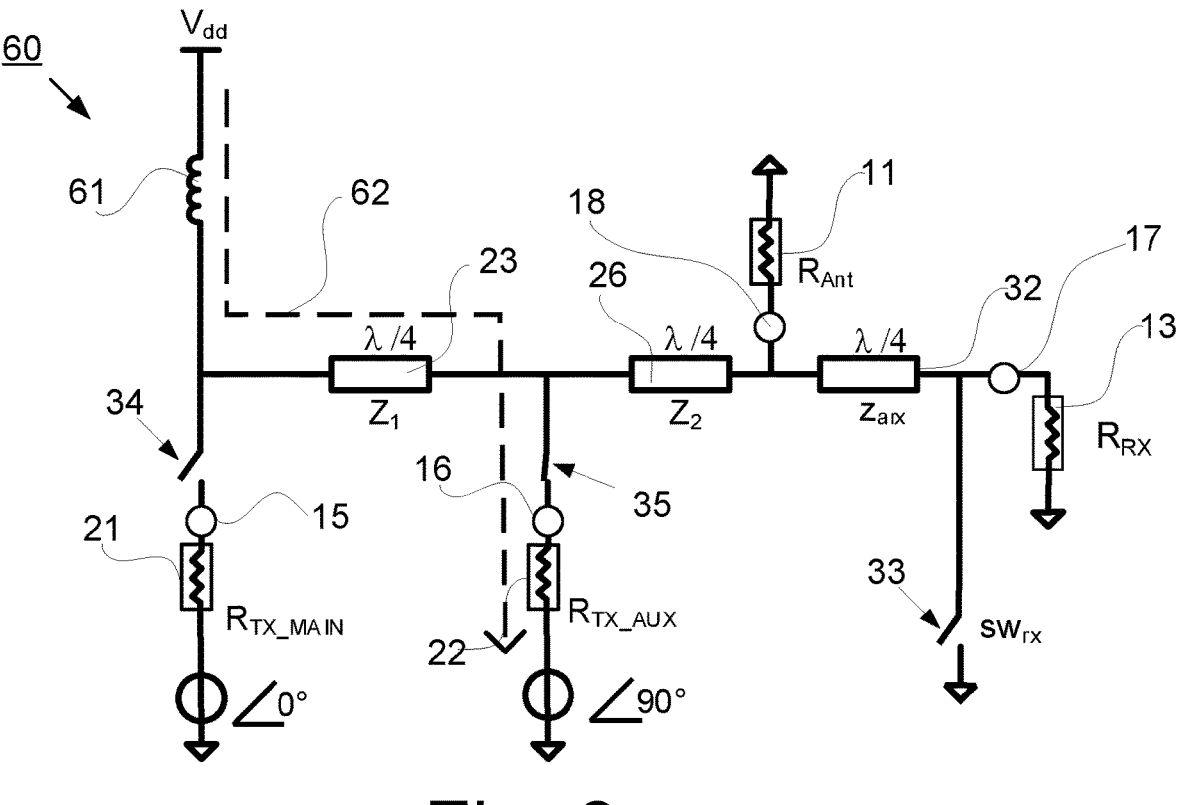
FIG. 6 illustrates a transceiver switch circuitry with an undesired high DC current flow in reception mode.

The transceiver switch circuitry 30, 40 or 50 is connected to a power supply (power supply connection for Doherty amplifier) $V_{dd}$ for operating in the Tx and Rx modes. In reception mode, the second switch circuitry 35 is in an ON state as described previously in reference to FIG. 3a. The second switch circuitry 35 is connected to ground on one side. The power supply $V_{dd}$, when turned on, delivers an undesired high DC current flow from $V_{dd}$ to ground in reception mode. FIG. 6 illustrates a transceiver switch circuitry 60 with the undesired high DC current flow 62 in reception mode.

In reception mode, the second transmitter circuitry 22 (or the aux amplifier 22) is connected to the transceiver switch circuitry 60, i.e. the second switch circuitry 35 is in the ON state as shown in FIG. 6. The second switch circuitry 35 is configured to connect the at least one second port 16 with the second side of the second quarter wavelength, λ/4, impedance transformer 26. When the second switch circuitry 35 is ON, high DC current flows from the power supply $V_{dd}$ via an inductor 61 through the second transmitter port 16 to ground, as shown by arrow 62. Such high DC current flowing into the second transmitter port 16 is not desirable and is according to an aspect of the disclosure prevented.

Figure 7:
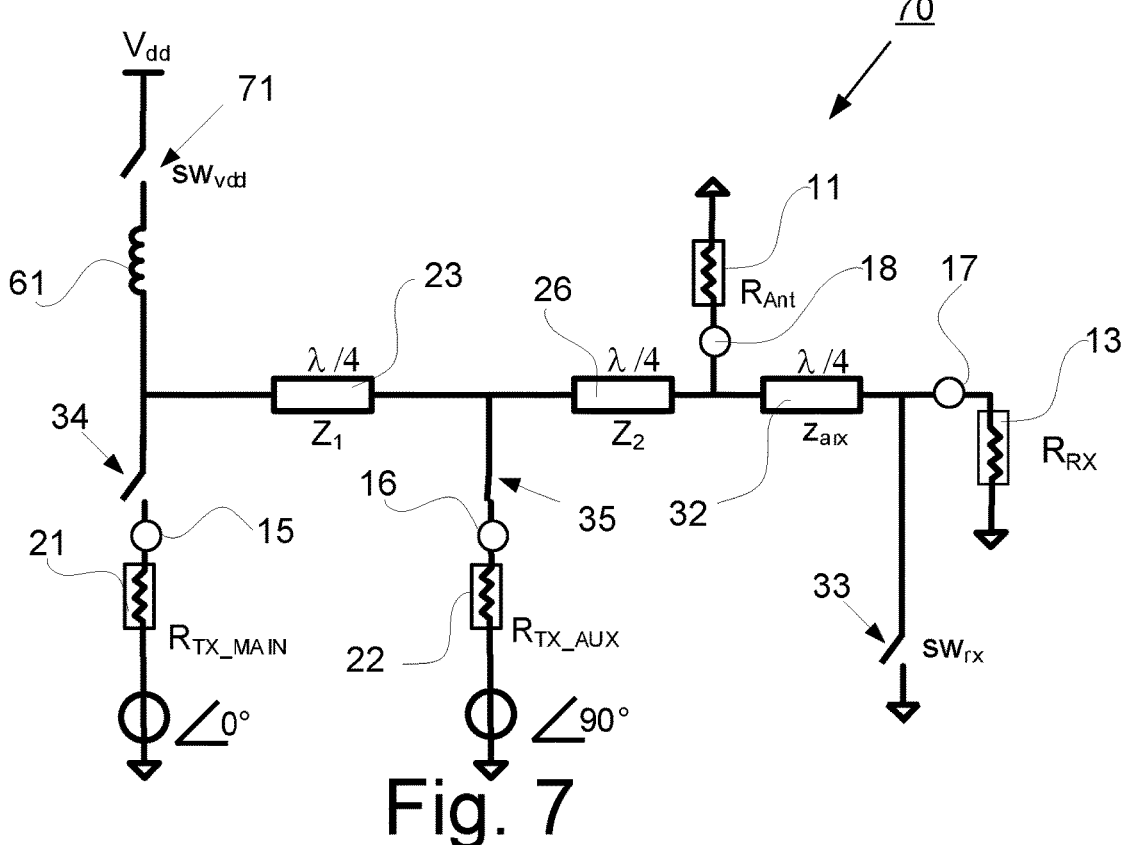
FIG. 7 illustrates a first example embodiment of a transceiver switch circuitry preventing high DC current flow in Rx mode.
Figures 8, 9:
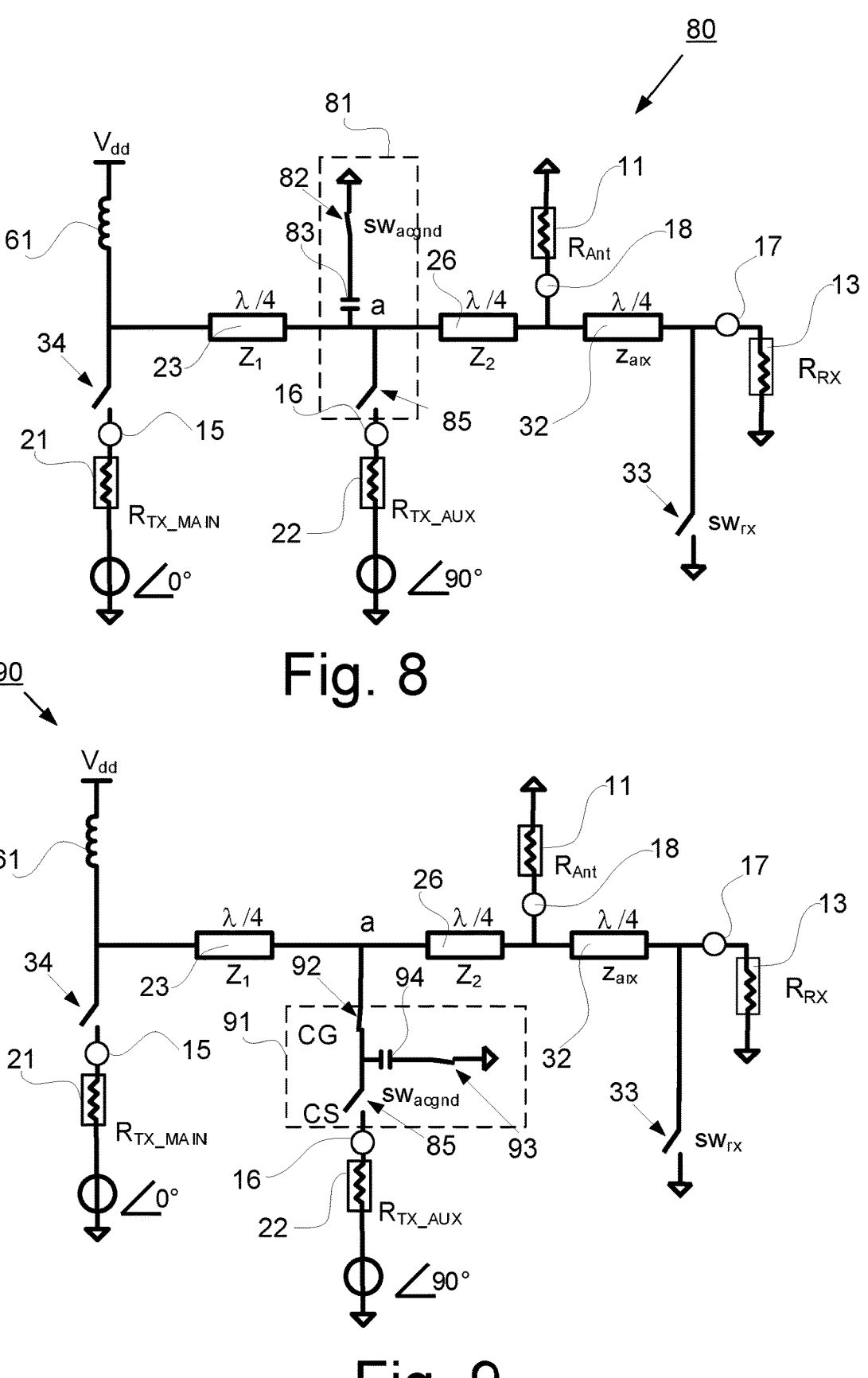
FIG. 8 illustrates a second example embodiment of a transceiver switch circuitry preventing high DC current flow in reception mode.
FIG. 9 illustrates a third example embodiment of a transceiver switch circuitry preventing high DC current flow in reception mode.

FIGS. 7, 8 and 9 illustrate example embodiments of a transceiver switch circuitry 70, 80 and 90 for preventing the undesired high DC current flow in reception mode as illustrated in FIG. 6. FIG. 7 illustrates implementing a direct current, DC, voltage switch 71 (also denoted $SW_{Vdd}$) which is configured to prevent a DC current to flow to the ground via the second switch circuitry 35. The DC voltage switch 71 is either integrated or implemented on PCB. The DC voltage switch 71 can be used to block the DC current from reaching the second transmitter port 16 of the transceiver switch 70 during reception mode. The first transmitter circuitry 21 and the second transmitter circuitry 22 (main amplifier and aux amplifier) are supplied by the $V_{dd}$, which supply is cut off by opening or turning OFF the DC voltage switch 71 during reception mode.

However, implementing the DC voltage switch 71 may result in a DC power loss during transmission operation. In addition, due to settling time requirements, this solution may restrict the duty cycle with which second transmitter circuitry 22 and receiver circuitry 13 can be activated.

Figure 18:
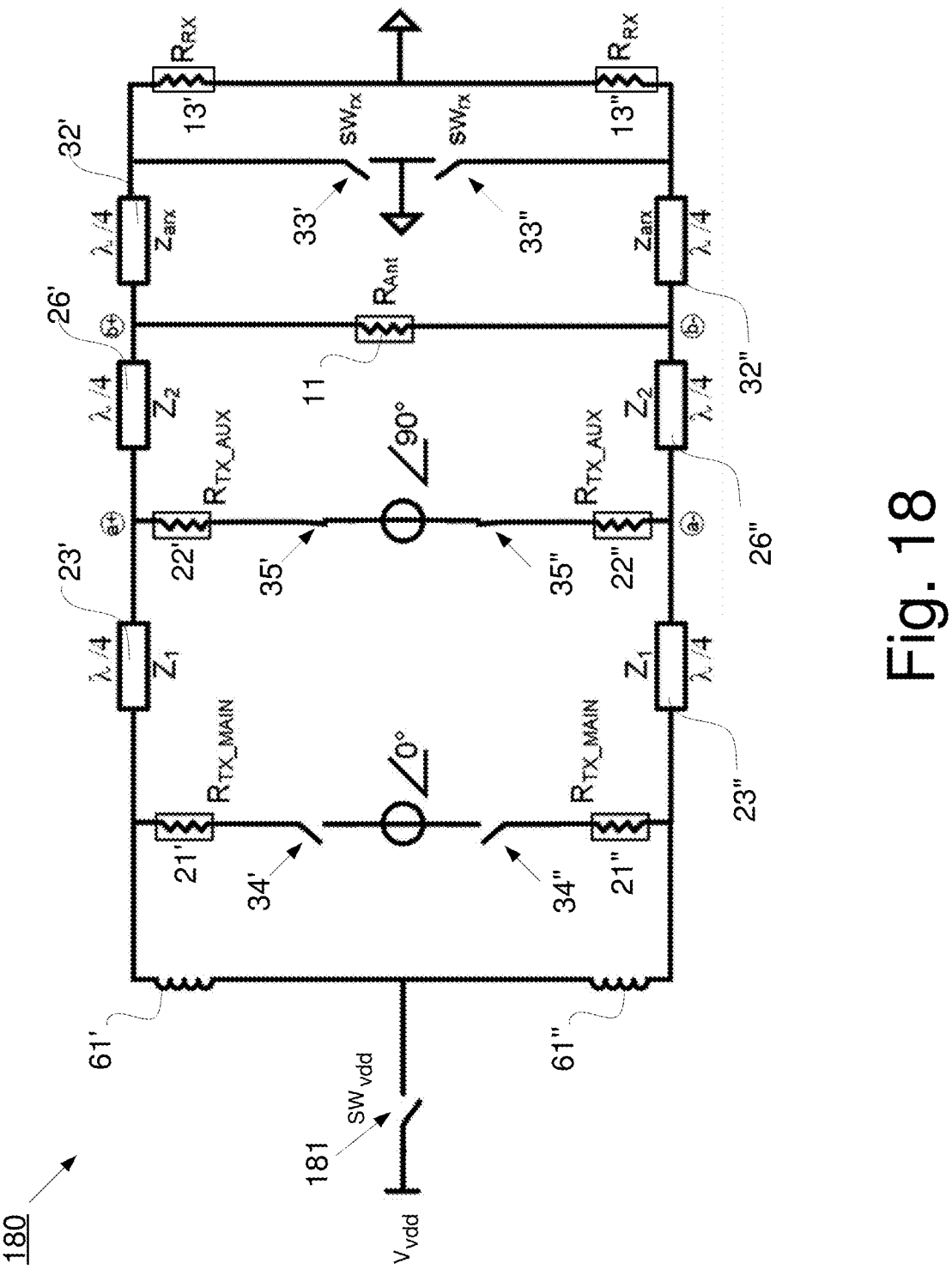
FIG. 18 illustrates an example of a differential implementation of Distributed Power Amplifiers.

FIG. 18 illustrates a differential implementation of a distributed power amplifier similar to the transceiver switch circuitry illustrated in FIG. 7. On the positive side of the differential configuration transmission lines are denoted 23', 26' and 32', switch circuitry are denoted 33', 34' and 35', inductor is denoted 61', receiver circuitry is denoted 13' and amplifiers are denoted 21' and 22'. Similarly, on the negative side of the differential configuration transmission lines are denoted 23", 26" and 32", switch circuitry are denoted 33", 34" and 35", inductor is denoted 61", receiver circuitry is denoted 13" and amplifiers are denoted 21" and 22". A common voltage switch 181 is provided to facilitate the same functionality as in FIG. 7.

FIG. 8 illustrates an example embodiments of a transceiver switch circuitry 80 with an example second switch circuitry 81 for preventing the undesired high DC current flow in reception mode. The second switch circuitry 81 implements an alternating current, AC, ground switch 82 (also denoted $SW_{acgnd}$) and a second port switch 85. The AC ground switch 82 is configured to ground the second side of the second quarter wavelength, λ/4, impedance transformer 26 while the at least one second port switch 85 is open in reception mode.

The AC ground switch 82 is implemented/positioned at the second side of the second quarter wavelength, λ/4, impedance transformer 26, for example, at the node denoted by or marked "a" as shown in FIG. 8, such that it does not draw any DC current while grounding the second side of the second quarter wavelength, λ/4, impedance transformer 26 in an AC sense in reception mode. This allows disconnecting the second transmitter circuitry 22 or the aux amplifier 22 by opening the at least one second port switch 85, so it does not draw any DC current from the power supply $V_{dd}$, while allowing the second side of the second quarter wavelength, λ/4, impedance transformer 26 to act as AC ground. The circuit then works correctly as a transceiver switch in reception mode at the cost of integrating an extra CMOS switch.

A capacitor 83 is implemented in series with the AC ground switch 82 as shown in FIG. 8. Placing the capacitor 83 in series with the AC ground switch 82 avoids charging and discharging the capacitor 83 every time the operating mode of the circuit is changed between transmission and reception.

Since the AC ground switch 82 must be OFF in Tx mode, the second side of the second quarter wavelength, λ/4, impedance transformer 26 is an ideal place to position the AC ground switch 82 since the impedance at the second side of the second quarter wavelength, λ/4, impedance transformer 26 is lowest in Tx mode. The low impedance results in minimum voltage levels across the AC ground switch 82 for a given output power in the Tx mode. In addition, this solution provides the opportunity to absorb the parasitic capacitance due to this switch into the capacitance needed for the lumped pi section implementation of the quarter wavelength, λ/4, impedance transformers as shown in FIG. 4. This configuration is capable for working for all disclosed amplifier topologies. For differential circuits, the $SW_{acgnd}$ may be placed across the differential output lines at middle nodes "a+" and "a−".

If the second transmitter circuitry 22 or the aux amplifier 22 is implemented as a series of two devices such as a Cascode or a stacked configuration, another example solution to prevent undesired high DC current flow in reception mode can be achieved as illustrated in FIG. 9.

FIG. 9 illustrates a third example embodiment of a transceiver switch circuitry 91 preventing high DC current flow in reception mode. The second switch circuitry 91 implements an alternating current, AC, ground switch 93 (also denoted $SW_{acgnd}$) and a second port switch 85.

The second switch circuitry 91 further comprises a common gate switch 92 connected between the at least one second port switch 85 and the second side of the second quarter wavelength, λ/4, impedance transformer 26, for example, at the node denoted by or marked "a" as shown in FIG. 9. When the common gate switch 92 is conducting, i.e. ON, and the at least one second port switch is open, i.e. OFF, the AC ground switch 93 is arranged to provide AC ground to the second side of the second quarter wavelength, λ/4, impedance transformer 26. Thus, the common gate switch 92 is configured to ground the second side of the second quarter wavelength, λ/4, impedance transformer 26 when the AC ground switch 93 is closed and the at least one second port switch 85 is open.

The AC ground switch 93 must be OFF in Tx mode. However, the AC ground switch 93 will see smaller voltage levels across itself compared to the voltage levels present at the second side of the second quarter wavelength, λ/4, impedance transformer 26, since the middle node of a Cascode or stacked structure typically sees around half the voltage swing present on the output line.

The transceiver switch circuitry 30, 40, 50, 60, 70, 80, 90 is adapted for differential operation. In a differential solution, a differential version of the transceiver switch circuitry 30, 40, 50, 60, 70, 80, 90 can be implemented by putting a single CMOS switch across the middle nodes of the differential branches.

Figure 10:
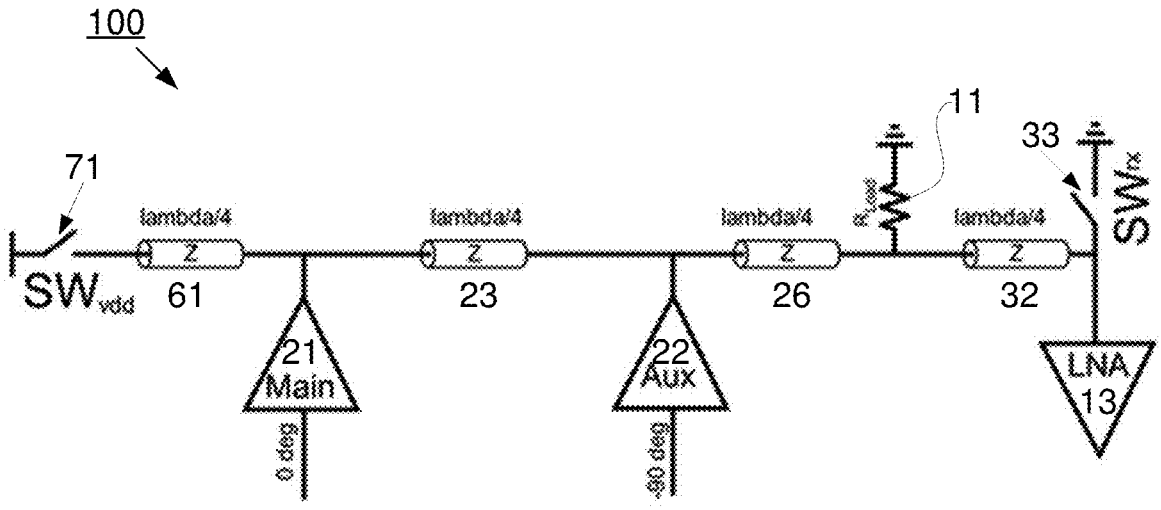
FIG. 10 illustrates a schematic of a transceiver used for simulation.

FIG. 10 illustrates a schematic of a transceiver 100 used for simulation. As seen in the schematic, the transceiver 100 comprises an arrangement of a Doherty amplifier 21 and 22 as a transmit arrangement, a low noise amplifier, LNA, 13 as receive arrangement and an antenna 11. The Doherty amplifier is connected to $V_{dd}$ supply and the transceiver 100 further includes a $V_{dd}$ series switch 71 as shown in FIG. 10.

The Doherty amplifier of the transceiver 100 is a Doherty PA operating at 22 GHz is implemented in cadence using Global Foundries, GF, 22 nm fully depleted Silicon on Insulator, FD-SOI, CMOS process. Transmission lines are implemented using lumped L/C components. Inductors are drawn in the upper thick copper metal layers and simulated in ADS momentum. Transistors in the main and auxiliary amplifiers 21, 22 are laid out and extracted views are used for simulations. The series switch 71 is added to enable possibility to turn off the $V_{dd}$ supply to the main and auxiliary amplifiers 21, 22 during reception operation. As a measure for the transmitter insertion loss, the difference between the output power and the output power when operating in transmission mode but without the transmission line connecting and without the $V_{dd}$ series switch 71 to the receiver is used.

The $V_{dd}$ series switch 71 must handle a large current with low voltage drop to minimize dissipated power in it. A design of the $V_{dd}$ series switch 71 consisting of three stacked thin-oxide PMOS transistors in GF 22 nm was designed according to the schematic of FIG. 10. Still within safe operating region, dictated by the process technology, the switch 71 can operate at 2.7V and deliver a DC current of 0.5 A with a DC loss of less than 12 mV resulting in a power loss of less than 6 mW. Since the output power when the amplifier is saturated, Psat, for this PA is above 500 mW this power loss has very limited impact. A transient simulation shows the switching procedure from ON/OFF (TX/RX), when loaded by 5.4 ohm and 100 pF. The layout of the $V_{dd}$ series switch 71 will consume about 250 um×250 um.

Figure 11:
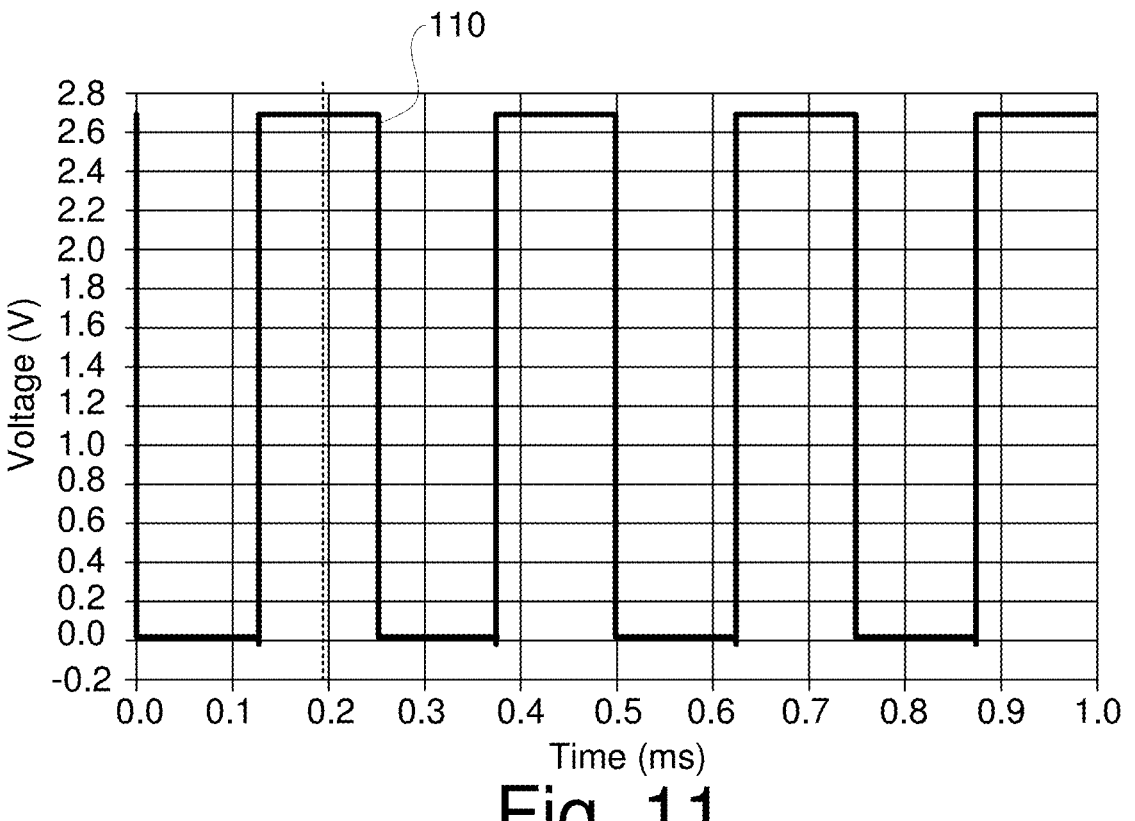
FIG. 11 illustrates transient simulation of voltage out from the $V_{dd}$ series switch in the transceiver of FIG. 10.

FIG. 11 illustrates transient simulation of voltage out (output voltage) from the $V_{dd}$ series switch 71 in the transceiver of FIG. 10. The simulation results of FIG. 11 display transient response characteristic 110 of the voltage out plotted against time (milliseconds) when the switch 71 is operating at 2.7V loaded by a 5.4-ohm resistor and a 100 pF capacitor. Risetime is about 50 nS.

Figure 12:
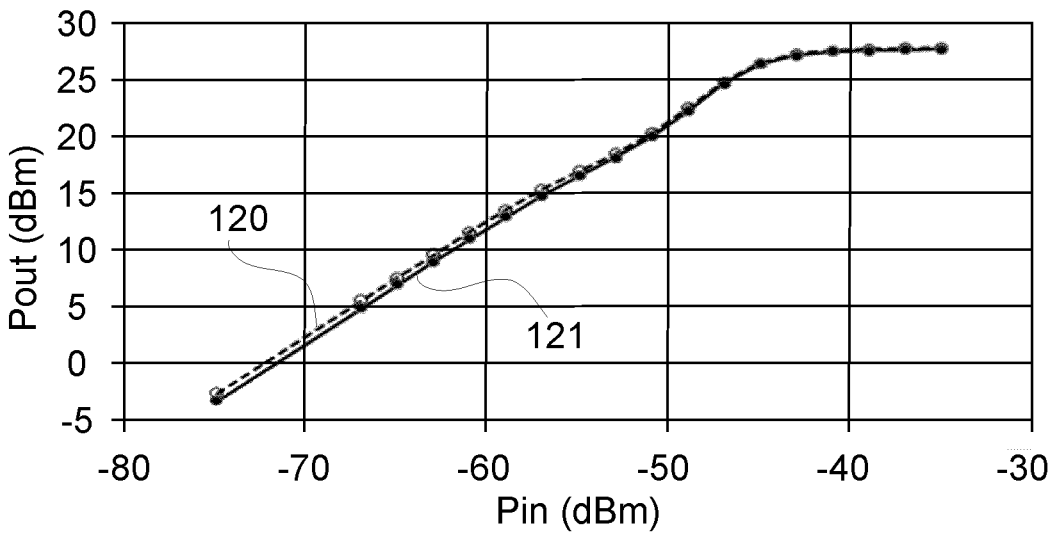
FIG. 12 illustrates simulation results for Tx output power for two different configurations of the transceiver of FIG. 10.

FIG. 12 illustrates simulation results for transmission output power for two different configurations of the transceiver of FIG. 10. The simulation results display the transmission output power without the $V_{dd}$ series switch and without transmission line connection to the receiver circuitry 13 indicated by dashed line 120 and with both the $V_{dd}$ series switch and the transmission line connection indicated by solid line 121.

Figure 13:
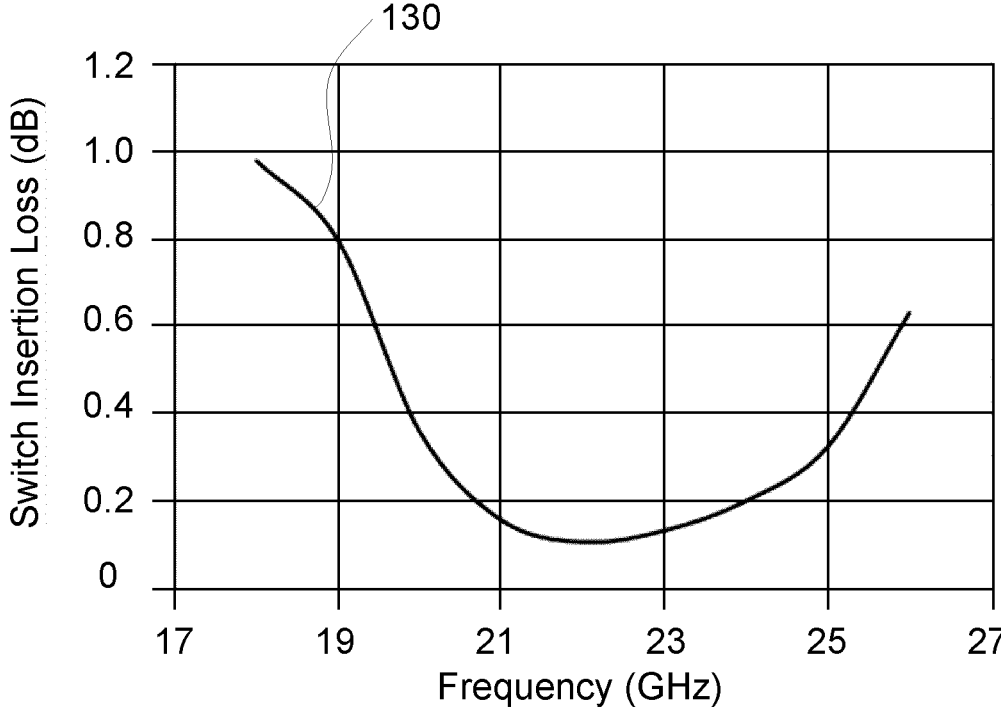
FIG. 13 illustrates simulation results for transmitter insertion loss at maximum output power for the transceiver of FIG. 10.

FIG. 13 illustrates simulation results for transmitter insertion loss for the transceiver of FIG. 10. The simulation results display a curve 130 for the transmission insertion loss at Psat (~27 dBm) plotted against frequency.

Figure 14:
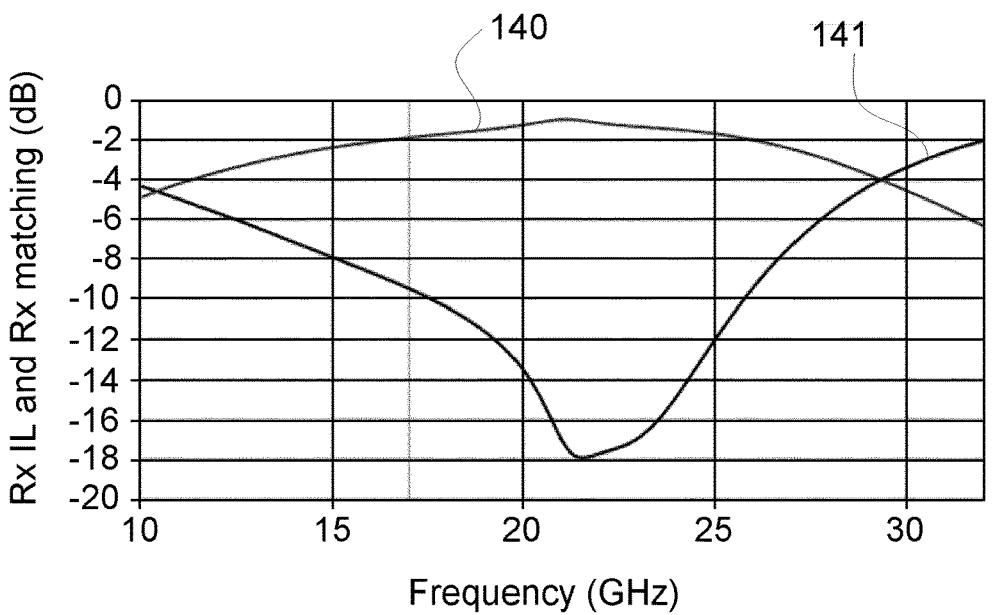
FIG. 14 illustrates simulation results for receiver insertion loss and Rx matching for the transceiver of FIG. 10.

FIG. 14 illustrates simulation results for receiver insertion loss and Rx matching for the transceiver of FIG. 10. The simulation results display the characteristics for receiver insertion loss indicated by solid line 140 and the characteristics for receiver matching indicated by solid line 141. The aux amplifier 22 or the second transmitter circuitry 22 is configured in a conductive mode so that it shorts its output to ground, creating a high impedance into the second transmitter circuitry 22, as observed from the antenna 11. To avoid DC current to flow from $V_{dd}$ to ground through the second transmitter circuitry 22, $V_{dd}$ is pulled to ground.

Figure 15:
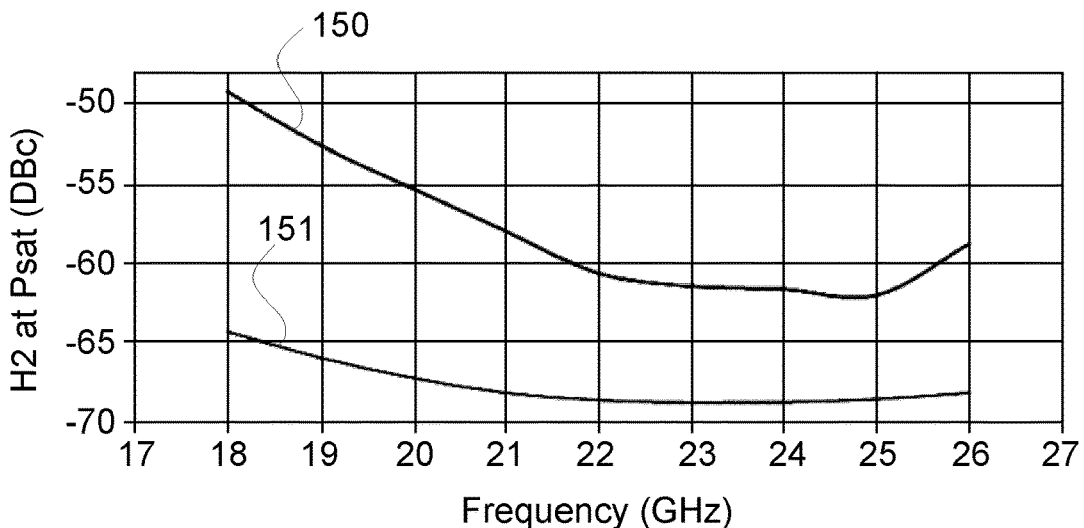
FIG. 15 illustrates simulation results for filtering of second order harmonics and IM2 for the transceiver of FIG. 10.

FIG. 15 illustrates simulation results for a filter performance for the transceiver of FIG. 10. The simulation results display the characteristic for the second order harmonics at Psat for the $V_{dd}$ series switch (such as the $V_{dd}$ series switch 71). The simulation results show the second order harmonics without the $V_{dd}$ series switch and without transmission line connection to the receiver circuitry 13 indicated by dashed line 150 and with both the $V_{dd}$ series switch and the transmission line connection indicated by solid line 151. The proposed switch ($V_{dd}$ series switch 71) helps filter out second order harmonics since the switch is based on electrical lengths of transmission lines, which will not be tuned correctly at twice the frequency.

Figure 16:
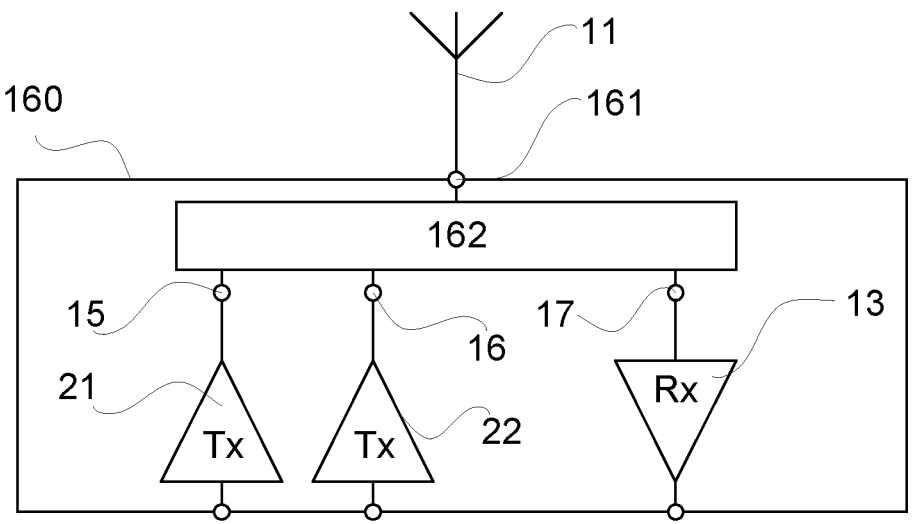
FIG. 16 illustrates a transceiver with a transceiver switch circuitry.

FIG. 16 illustrates a transceiver 160 with a transceiver switch circuitry 162 in accordance with some embodiments of the present disclosure. The transceiver switch circuitry 162 is illustrated in a transceiver 160 for wireless communication. The transceiver switch circuitry 162 is connectable to the antenna 11 via an antenna port 161 for transmitting transmission signals (such as transmission signals 36) during transmission mode, and receiving reception signals (such as reception signals 31) during reception mode.

The transceiver 160 comprises a first transmitter 21 connected to a first transmitter port 15 of the transceiver switch circuitry 162 and at least one second transmitter 22 connected to at least one second transmitter port 16 of the transceiver switch circuitry 162. The first transmitter 21 and the at least one second transmitter 22 are configured to generate transmission signals (such as transmission signals 36). The transceiver 160 comprises a receiver 13 connected to a receiver port 17 of the transceiver switch circuitry 162 and is configured to receive reception signals (such as reception signals 31). According to some embodiments, the first transmitter 21 and the at least one second transmitter 22 comprises a Doherty amplifier.

Figure 17:
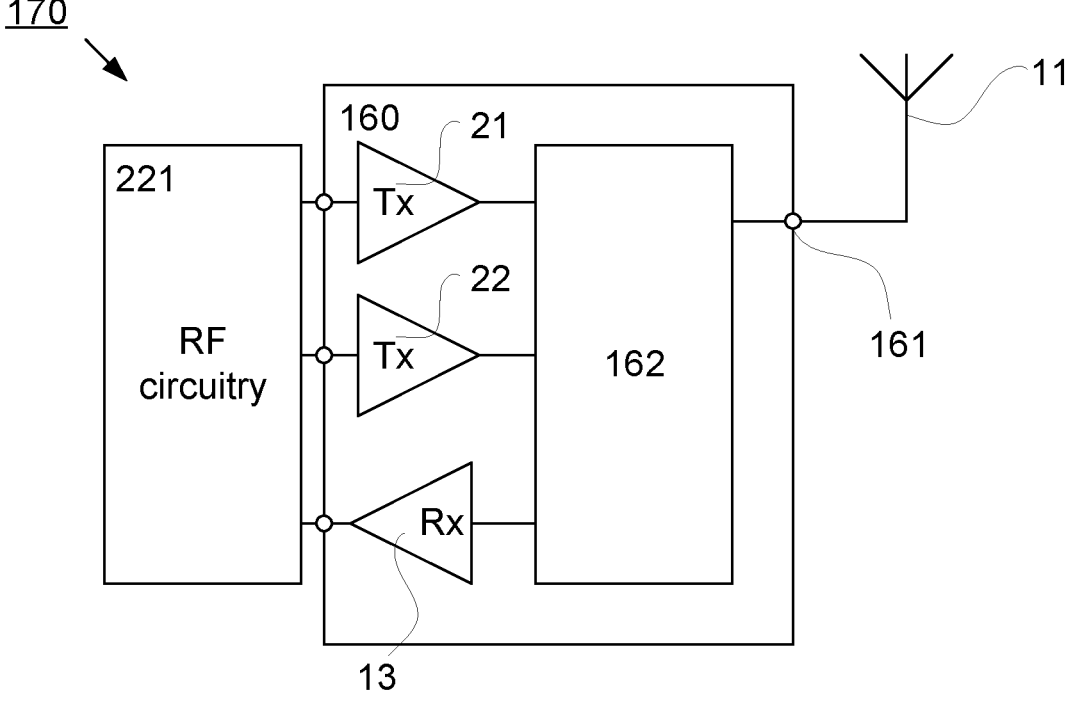
FIG. 17 illustrates an example communication node with a transceiver of FIG. 16.

FIG. 17 illustrates an example communication node 170 with a transceiver 160 of FIG. 16 and RF circuitry 221. The communication node 170 comprises the transceiver 160 and a communication arrangement 11 connected to the antenna port 161. The transceiver 160 will work in both a wireless system with an antenna connected to the antenna port 161, and a wireline system where a cable is connected to the antenna port 161 instead of the antenna. Preferably, the communication network is a wireless network and the communication arrangement is an antenna 11. The communication node 170, as an example, may be a wireless device or a base station.

The present disclosure is related to a transceiver switch circuitry 30; 40; 50; 60; 70; 80; 90; 180 comprising an antenna port 18 connectable to an antenna circuitry 11, a receiver port 17 connectable to a receiver circuitry 13, a first transmitter port 15 connectable to a first transmitter circuitry 21, and at least one second transmitter port 16 connectable to at least one second transmitter circuitry 22, wherein the transceiver switch circuitry is configured to be operable in a reception mode to allow reception signals 31 at the antenna port 18 to be forwarded to the receiver port 17, and configured to be operable in a transmission mode to allow transmission signals 36 at the first transmitter port 15 and the at least one second transmitter port 16 to be forwarded to the antenna port 18 for transmission, the transmission signals 36 having a transmission center frequency with a wavelength, λ, and the reception signals 31 having a reception center frequency within ten percent of the transmission center frequency.

The transceiver switch circuitry 30; 40; 50; 60; 70; 80; 90; 180 further comprises:
a receive arrangement connected between the antenna port 18 and the receiver port 17, the receive arrangement comprising a first quarter wavelength, λ/4, impedance transformer 32 and a first switch circuitry 33 configured to ground the first quarter wavelength, λ/4, impedance transformer 32 at the receiver port 17 in the transmission mode; and
a transmit arrangement connected between the antenna port 18, the first transmitter port 15 and the at least one second transmitter port 16, the transmit arrangement comprising a second quarter wavelength, λ/4, impedance transformer 26, having a first side connected to the antenna port 18, and a second switch circuitry 35; 81; 91 configured to ground a second side of the second quarter wavelength, λ/4, impedance transformer 26 in the reception mode for at least the center frequency of the transmission signals 36.

According to some embodiments, the receive arrangement is further configured to phase shift reception signals 31 in the reception mode, and the transmit arrangement is further configured to phase shift transmission signals 36 in the transmission mode.

According to some embodiments, during reception mode—the reception signals 31 only passes via the first quarter wavelength, λ/4, impedance transformer 32.

According to some embodiments, the transmit arrangement further comprises a third quarter wavelength, λ/4, impedance transformer 23, having a first side connected to the second side of the second quarter wavelength, λ/4, impedance transformer 26, and a third switch circuitry 34 configured to connect the first transmitter port 15 with a second side of the third quarter wavelength, λ/4, impedance transformer 23 in the transmission mode.

According to some embodiments, transceiver switch circuitry further comprising a direct current, DC, voltage switch 71; 181 and wherein, in reception mode, the second switch circuitry 35; 81; 91 is configured to connect the at least one second port 16 with the second side of the second quarter wavelength, λ/4, impedance transformer 26, and the DC voltage switch 71; 181 is configured to prevent a DC current 62 to flow via the second transmitter port 16.

According to some embodiments, the second switch circuitry 81; 91 comprises an alternating current, AC, ground switch 82; 93 and at least one second port switch 85, the AC ground switch 82; 93 being configured to ground the second side of the second quarter wavelength, λ/4, impedance transformer 26 while the at least one second port switch 85 is open in reception mode.

According to some embodiments, the second switch circuitry 91 further comprises a common gate switch 92 connected between the at least one second port switch 85 and the second side of the second quarter wavelength, λ/4, impedance transformer 26, the common gate switch 92 being configured to ground the second side of the second quarter wavelength, λ/4, impedance transformer 26 when the AC ground switch 93 is closed and the at least one second port switch 85 is open.

According to some embodiments, the first quarter wavelength, λ/4, impedance transformer 32 has an impedance that matches an impedance of the receiver circuitry.

According to some embodiments, the second quarter wavelength, λ/4, impedance transformer 26 has an impedance that matches an impedance of the antenna.

According to some embodiments, each quarter wavelength, λ/4, impedance transformer 23, 26, 32 is a transmission line having an electrical length of λ/4 of the center frequency.

According to some embodiments, each quarter wavelength, λ/4, impedance transformer 42, 43, 46; 52, 52, 56 comprises passive lumped components.

According to some embodiments, the passive lumped components comprise at least one inductor (L) and at least one capacitor (C) arranged in at least one pi section 42, 43, 46 or in at least one T section 52, 52, 56.

According to some embodiments, the reception center frequency is equal to the transmission center frequency.

According to some embodiments, the transceiver switch circuitry is adapted for differential operation.

The present disclosure also relates to a transceiver 100; 160 for wireless communication comprising:

at least one transceiver switch circuitry 162 being connectable to an antenna 11 via an antenna port 161 for transmitting transmission signals during transmission mode, and receiving reception signals during reception mode;

a first transmitter 21 connected to a first transmitter port 15 of the transceiver switch circuitry and at least one second transmitter 22 connected to at least one second transmitter port 16 of the transceiver switch circuitry, the first transmitter and the at least one second transmitter being configured to generate transmission signals; and a receiver 13 connected to a receiver port 17 of the transceiver switch circuitry and being configured to receive reception signals.

According to some embodiments, the first transmitter and the at least one second transmitter comprises a Doherty amplifier.

According to some embodiments, the transceiver is provided with two transceiver switch circuitries being arranged in a differential configuration.

The present disclosure further relates to a communication node 170 in a communication network comprising a transceiver 160 and a communication arrangement 11 connected to the antenna port 161.

According to some embodiments, the communication network is a wireless network and the communication arrangement is an antenna 11.

According to some embodiments, the communication node is a wireless device or a base station.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE may have been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

Also note that terminology such as eNodeB and wireless device should be considered as non-limiting and does in particular not imply a certain hierarchical relation between the two. In general "eNodeB" could be considered as device 1 and "wireless device" as device 2, and these two devices communicate with each other over some radio channel.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of transceiver switch circuitry, transceivers and nodes. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as having any number of antennas or antenna elements.

Although the description is mainly given for a transceiver switch circuitry, it should be understood by the skilled in the art that the transceiver switch circuitry is a part of a transceiver which is implemented in any wireless device, terminal, or node capable of receiving in DL and transmitting in UL (e.g. PDA, laptop, mobile, sensor, fixed relay, mobile relay or even a radio base station, e.g. femto base station).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A transceiver switch circuitry for signals having a center frequency with a wavelength, λ, the transceiver switch circuitry comprising:
  an antenna port connectable to an antenna circuitry;
  a receiver port connectable to a receiver circuitry;
  a first transmitter port connectable to a first transmitter circuitry; and
  at least one second transmitter port connectable to at least one second transmitter circuitry;
  the transceiver switch circuitry being configured to be operable in a reception mode to allow reception signals at the antenna port to be forwarded to the receiver port, and configured to be operable in a transmission mode to allow transmission signals at the first transmitter port and the at least one second transmitter port to be forwarded to the antenna port for transmission, the transmission signals having a transmission center frequency with the wavelength, λ, and the reception signals having a reception center frequency within ten percent of the transmission center frequency
  a receive arrangement connected between the antenna port and the receiver port, the receive arrangement comprising a first quarter wavelength, λ/4, impedance transformer and a first switch circuitry configured to ground the first quarter wavelength, λ/4, impedance transformer at the receiver port in the transmission mode;
  a transmit arrangement connected between the antenna port, the first transmitter port and the at least one second transmitter port, the transmit arrangement comprising a second quarter wavelength, λ/4, impedance transformer, having a first side connected to the antenna port, and a second switch circuitry configured to ground a second side of the second quarter wavelength, λ/4, impedance transformer in the reception mode for at least the center frequency of the transmission signals, the first transmitter port being connected to a different portion of the transmit arrangement than the at least one second transmitter port; and
  a direct current, DC, voltage switch and wherein, in reception mode, the second switch circuitry is configured to connect the at least one second transmitter port with the second side of the second quarter wavelength, λ/4, impedance transformer, and the DC voltage switch is configured to prevent a DC current to flow via the at least second transmitter port.

2. The transceiver switch circuitry according to claim 1, wherein the receive arrangement is further configured to phase shift reception signals in the reception mode, and the transmit arrangement is further configured to phase shift transmission signals in the transmission mode.

3. The transceiver switch circuitry according to claim 1, wherein, during reception mode, the reception signals only passes via the first quarter wavelength, λ/4, impedance transformer.

4. The transceiver switch circuitry according to claim 1, wherein the transmit arrangement further comprises a third quarter wavelength, λ/4, impedance transformer, having a first side connected to the second side of the second quarter wavelength, λ/4, impedance transformer, and a third switch circuitry configured to connect the first transmitter port with a second side of the third quarter wavelength, λ/4, impedance transformer in the transmission mode.

5. The transceiver switch circuitry according to claim 1, wherein the second switch circuitry comprises an alternating current, AC, ground switch and at least one second port switch, the AC ground switch being configured to ground the second side of the second quarter wavelength, λ/4, impedance transformer while the at least one second port switch is open in reception mode.

6. The transceiver switch circuitry according to claim 5, wherein the second switch circuitry further comprises a common gate switch connected between the at least one second port switch and the second side of the second quarter wavelength, λ/4, impedance transformer, the common gate switch being configured to ground the second side of the second quarter wavelength, λ/4, impedance transformer when the AC ground switch is closed and the at least one second port switch is open.

7. The transceiver switch circuitry according to claim 1, wherein the first quarter wavelength, λ/4, impedance transformer has an impedance that matches an impedance of the receiver circuitry.

8. The transceiver switch circuitry according to claim 1, wherein the second quarter wavelength, λ/4, impedance transformer has an impedance that matches an impedance of the antenna.

9. The transceiver switch circuitry according to claim 1, wherein each quarter wavelength, λ/4, impedance transformer is a transmission line having an electrical length of λ/4 of a center frequency.

10. The transceiver switch circuitry according to claim 1, wherein each quarter wavelength, λ/4, impedance transformer comprises passive lumped components.

11. The transceiver switch circuitry according to claim 10, wherein the passive lumped components comprise at least one inductor (L) and at least one capacitor (C) arranged in at least one pi section or in at least one T section.

12. The transceiver switch circuitry according to claim 1, wherein the reception center frequency is equal to the transmission center frequency.

13. The transceiver switch circuitry according to claim 1, wherein the transceiver switch circuitry is configured for differential operation.

14. A transceiver for wireless communication comprising:
  at least one transceiver switch circuitry being connectable to an antenna via an antenna port for transmitting transmission signals during transmission mode, and receiving reception signals during reception mode, the at least one transceiver switch circuitry comprising:
  an antenna port connectable to an antenna circuitry;
  a receiver port connectable to a receiver circuitry;
  a first transmitter port connectable to a first transmitter circuitry; and
  at least one second transmitter port connectable to at least one second transmitter circuitry;
  the transceiver switch circuitry being for signals having a center frequency with a wavelength, λ, and being configured to be operable in a reception mode to allow reception signals at the antenna port to be forwarded to the receiver port, and configured to be operable in a transmission mode to allow transmission signals at the first transmitter port and the at least one second transmitter port to be forwarded to the antenna port for transmission, the transmission signals having a transmission center frequency with the wavelength, λ, and the reception signals having a reception center frequency within ten percent of the transmission center frequency;

a receive arrangement connected between the antenna port and the receiver port, the receive arrangement comprising a first quarter wavelength, λ/4, impedance transformer and a first switch circuitry configured to ground the first quarter wavelength, λ/4, impedance transformer at the receiver port in the transmission mode; and a transmit arrangement connected between the antenna port, the first transmitter port and the at least one second transmitter port, the transmit arrangement comprising a second quarter wavelength, λ/4, impedance transformer, having a first side connected to the antenna port, and a second switch circuitry configured to ground a second side of the second quarter wavelength, λ/4, impedance transformer in the reception mode for at least the center frequency of the transmission signals, the first transmitter port being connected to a different portion of the transmit arrangement than the at least one second transmitter port;

a first transmitter connected to a first transmitter port of the transceiver switch circuitry and at least one second transmitter connected to at least one second transmitter port of the transceiver switch circuitry, the first transmitter and the at least one second transmitter being configured to generate transmission signals;

a receiver connected to a receiver port of the transceiver switch circuitry and being configured to receive reception signals; and a direct current, DC, voltage switch and wherein, in reception mode, the second switch circuitry is configured to connect the at least one second transmitter port with the second side of the second quarter wavelength, λ/4, impedance transformer, and the DC voltage switch is configured to prevent a DC current to flow via the at least second transmitter port.

15. The transceiver according to claim 14, wherein the first transmitter and the at least one second transmitter comprises a Doherty amplifier.

16. The transceiver according to claim 14, wherein two transceiver switch circuitries are provided being arranged in a differential configuration.

17. A communication node in a communication network comprising:

a transceiver, comprising:

at least one transceiver switch circuitry being connectable to an antenna via an antenna port for transmitting transmission signals during transmission mode, and receiving reception signals during reception mode, the at least one transceiver switch circuitry comprising:

an antenna port connectable to an antenna circuitry;

a receiver port connectable to a receiver circuitry;

a first transmitter port connectable to a first transmitter circuitry; and at least one second transmitter port connectable to at least one second transmitter circuitry;

the transceiver switch circuitry being for signals having a center frequency with a wavelength, λ, and being configured to be operable in a reception mode to allow reception signals at the antenna port to be forwarded to the receiver port, and configured to be operable in a transmission mode to allow transmission signals at the first transmitter port and the at least one second transmitter port to be forwarded to the antenna port for transmission, the transmission signals having a transmission center frequency with the wavelength, λ, and the reception signals having a reception center frequency within ten percent of the transmission center frequency;

a receive arrangement connected between the antenna port and the receiver port, the receive arrangement comprising a first quarter wavelength, λ/4, impedance transformer and a first switch circuitry configured to ground the first quarter wavelength, λ/4, impedance transformer at the receiver port in the transmission mode; and a transmit arrangement connected between the antenna port, the first transmitter port and the at least one second transmitter port, the transmit arrangement comprising a second quarter wavelength, λ/4, impedance transformer, having a first side connected to the antenna port, and a second switch circuitry configured to ground a second side of the second quarter wavelength, λ/4, impedance transformer in the reception mode for at least the center frequency of the transmission signals, the first transmitter port being connected to a different portion of the transmit arrangement than the at least one second transmitter port;

a first transmitter connected to a first transmitter port of the transceiver switch circuitry and at least one second transmitter connected to at least one second transmitter port of the transceiver switch circuitry, the first transmitter and the at least one second transmitter being configured to generate transmission signals; and a receiver connected to a receiver port of the transceiver switch circuitry and being configured to receive reception signals; and a direct current, DC, voltage switch and wherein, in reception mode, the second switch circuitry is configured to connect the at least one second transmitter port with the second side of the second quarter wavelength, λ/4, impedance transformer, and the DC voltage switch is configured to prevent a DC current to flow via the at least second transmitter port; and a communication arrangement connected to the antenna port.

18. The communication node according to claim 17, wherein the communication network is a wireless network and the communication arrangement is an antenna.

19. The communication node according to claim 18, wherein the communication node is a wireless device or a base station.

* * * * *